United States Patent [19]

Kako et al.

[11] 4,234,821
[45] Nov. 18, 1980

[54] FLAT PANEL TELEVISION RECEIVER IMPLEMENTED WITH A THIN FILM EL PANEL

[75] Inventors: Noritoshi Kako, Kashihara; Yasukuni Yamane, Tenri; Chuji Suzuki, Nara, all of Japan

[73] Assignee: Sharp Kabushiki Kaisha, Osaka, Japan

[21] Appl. No.: 941,202

[22] Filed: Sep. 11, 1978

[30] Foreign Application Priority Data

| Sep. 14, 1977 | [JP] | Japan | 52/110898 |
| Sep. 17, 1977 | [JP] | Japan | 52/112009 |
| Sep. 19, 1977 | [JP] | Japan | 52/113091 |
| Sep. 26, 1977 | [JP] | Japan | 52/116206 |
| Sep. 30, 1977 | [JP] | Japan | 52/118073 |
| Sep. 30, 1977 | [JP] | Japan | 52/118076 |

[51] Int. Cl.² .......... H04N 5/70; H05B 33/08
[52] U.S. Cl. .......... 315/169.3; 340/466 EL; 340/781; 358/241
[58] Field of Search .......... 315/169 R, 169 TV, 169.3; 340/324 M, 166 EL, 781; 365/110, 111, 112; 358/241

[56] References Cited

U.S. PATENT DOCUMENTS

| 3,532,809 | 10/1970 | Witmer | 315/169.3 X |
| 3,752,910 | 8/1973 | Lewis | 358/241 X |
| 3,946,371 | 3/1976 | Inazaki et al. | 365/111 |
| 3,975,661 | 8/1976 | Kanatani et al. | 340/781 X |
| 4,152,626 | 5/1979 | Hatta et al. | 340/166 EL X |

Primary Examiner—Eugene R. LaRoche
Attorney, Agent, or Firm—Birch, Stewart, Kolasch & Birch

[57] ABSTRACT

A flat panel television receiver implemented with a thin-film electroluminescent panel allows viewer's selection of a normal moving picture and a steady picture mode which resorts to the inherent hysteresis properties of the EL panel. A write field interval and an erase field interval are assigned alternatively with respect to each other.

13 Claims, 21 Drawing Figures

FLAT PANEL TELEVISION RECEIVER IMPLEMENTED WITH A THIN FILM EL PANEL

BACKGROUND OF THE INVENTION

The present invention relates to a television receiver and more particularly to a flat panel television receiver implemented with a thin film electroluminescent panel (this is referred to as "ELP").

In the past, there were several approaches to obtaining a steady picture within a cathode ray tube television receiver while receiving a transmitted video signal. A typical way was to use a delay line with a capacity of at least one frame. However, this approach was not acceptable from a standpoint of practical use.

OBJECTS AND SUMMARY OF THE INVENTION

It is therefore an object of the present invention to provide a technique for obtaining a steady picture in a television receiver at any desired time and at any desired interval.

As noted earlier, the present invention is concerned with a TV receiver using an ELP. Specifically, the TV receiver embodying the present invention provides a control system for allowing viewer's selection of a normal moving picture mode and a steady picture mode which utilizes the inherent hysteresis properties of the ELP.

In one aspect of the present invention, there is provided a TV image display using a thin-film electroluminescent panel which shows hysteresis properties in the relationship between applied voltage and brightness. A write field interval and an erase field interval are assigned alternatively with respect to each other. If both an erase pulse and a write pulse are prevented from being supplied to respective electrodes of the electroluminescent panel in synchronism with the beginning of the erase field interval, then the TV image will come to a standstill. Details of construction and operation of the thin-film electroluminescent panel (ELP) are disclosed in U.S. Pat. No. 3,975,661 DRIVING METHOD FOR A THIN-FILM ELECTROLUMINESCENT ELEMENT OF A THREE-LAYER CONSTRUCTION assigned to the same assignee as this application.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings, an wherein.

DETAILED DESCRIPTION OF THE INVENTION

Figure 1A:
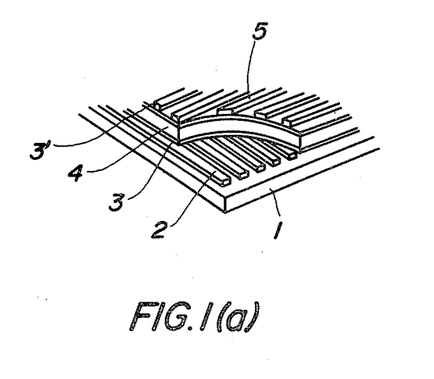
FIGS. 1(a) and 1(b) are a fragmentary perspective view and a cross sectional view of a thin-film ELP used with a TV receiver of the present invention.
Figure 1B:
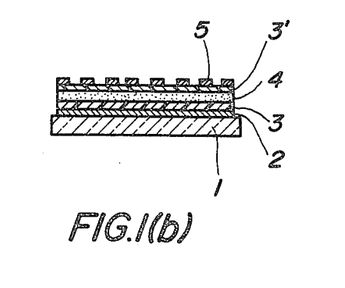

Attention is initially invited to construction and properties of the thin-film ELP. In FIGS. 1(a) and 1(b), a predetermined number of first strip-like transparent electrodes 2 are disposed on a glass support 1 in juxtaposition with each other. On the transparent electrode 2 there is disposed a layer 3 of dielectric material for example $Y_2O_3$, a layer 4 of electroluminescent material doped with active material serving as luminous centers, for example, ZnS:Mn and a different layer 3' of the same dielectric material as above by a well known deposite technique such as vacuum evaporation and sputtering, forming the three-layer structure ELP. In addition, a predetermined number of second strip-like transparent electrodes 5 are disposed normal to the above mentioned transparent electrodes 2. When a suitable voltage is applied between a selected one of the first electrode family 2 and a selected one of the second electrode family 5, only a very limited area crossing therewith is allowed to release light (luminescence). This corresponds to a picture element.

Figure 2A:
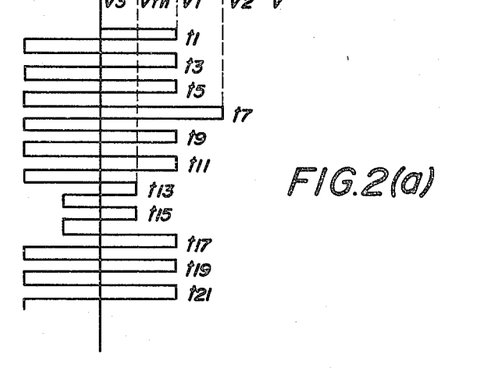
FIGS. 2(a) thru 2(c) are graphs showing hysteresis properties in the applied voltage vs brightness relationship of the thin-film ELP.
Figures 2B, 2C:
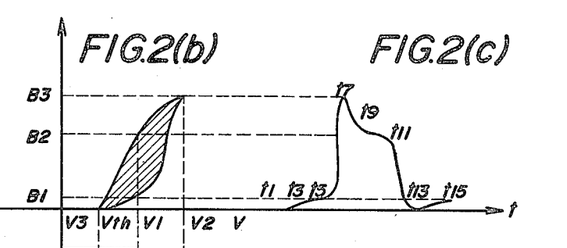

The ELP will release light with a fixed intensity every time a voltage is applied as long as the applied voltage remains constant. The brightness of the ELP will follow the hysteresis loop characteristics as the applied voltage is varied. The hysteresis properties will be apparent as shown in FIG. 2, where, upon initial application of a pulse having a voltage amplitude $V_1$ as seen from FIG. 2(a), the brightness of the ELP will be at the level $B_1$ of FIG. 2(b). It will be noted that $V_1 > V_{th}$ wherein $V_{th}$ is a given threshold voltage level. If a suitable write voltage $V_2$ is applied under the circumstance, then the brightness will jump to the maximum level $B_3$ suddenly. Subsequently, provided that the applied voltage is restored to a sustain voltage level $V_1$, the light intensity will settle at $B_2$ higher than $B_1$. Upon subsequent application of an erase voltage $V_3$ the intensity significantly drops. The brightness will rest in $B_1$ if the sustain voltage $V_1$ is reached again. The history of the hysteresis loop characteristics can be traced by monitering the symbols $t_1, t_3, \ldots t_{21}$ in FIG. 2(c). It is understood that the hysteresis loop characteristics may describe any loop in accordance with the amplitude and width of the write voltage as viewed from FIG. 2(b). This makes it possible to provide half tone display.

Figure 3:
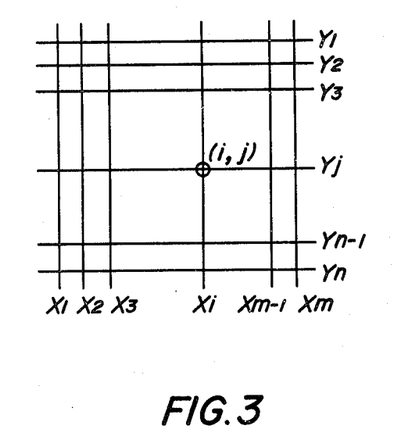
FIG. 3 is an electrode pattern of the thin-film ELP.

In order to provide TV images through the utilization of the ELP with the hysteresis properties, all individual electrodes are disposed in the form of n lines by m columns as seen from FIG. 3 such that one electrode family, e.g., column electrode $X_1$-$X_m$ are supplied with two-valued or multi-tone display signals and the other electrode family, for example, line electrodes $Y_l$-$Y_n$ with write control signals, erase control signals, and sustain signals effective to hold the write state or erase state.

Figure 4:
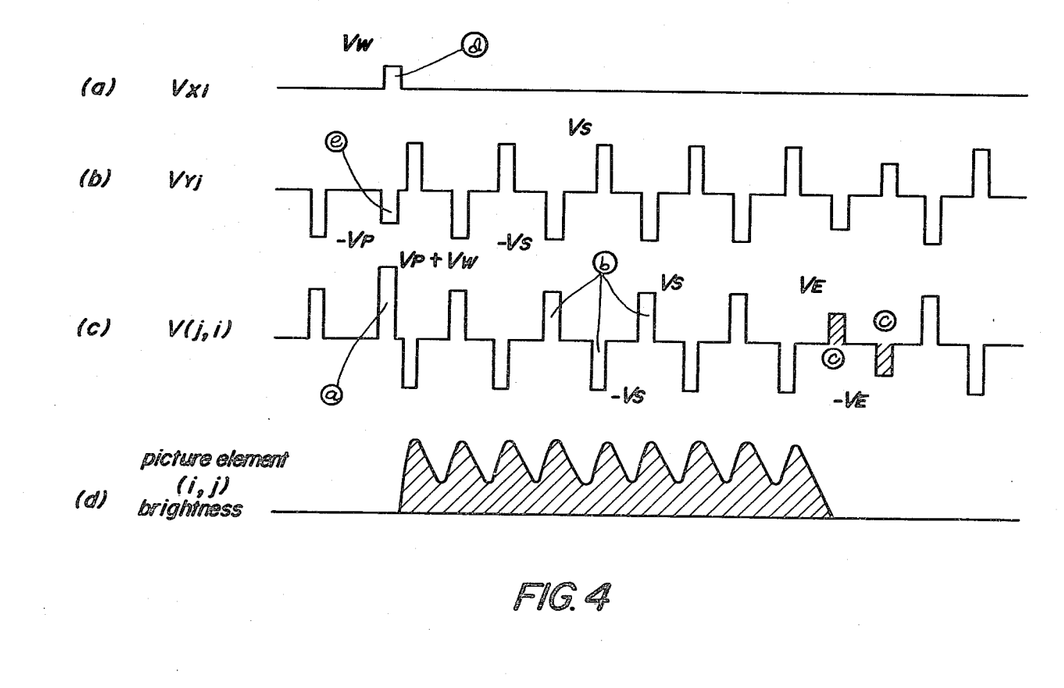
FIG. 4 is a time chart showing the relationship between waveforms of voltages applied to respective electrodes of the thin film ELP and ones of luminescence.
Figure 5:
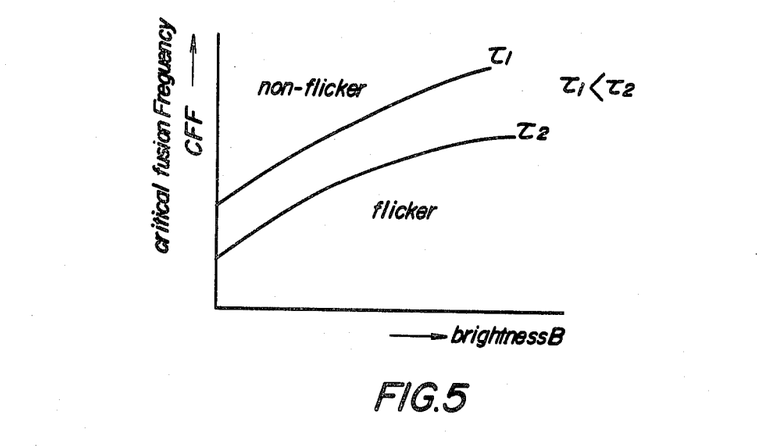
FIG. 5 is a graph showing vision characteristics of the human eye.

FIGS. 4(a) through 4(c) illustrate time charts of voltage waveforms $V_{xi}$, $Y_{vj}$, and $V_{(i, j)}$ developing at the specific electrodes $X_i$, $Y_j$ and their crossed picture element (i,j) when the display signals is impressed on that picture element of all the picture elements in the n line by m column matrix. FIG. 4(d) depicts luminescence released from the picture element (i,j) in response to the applied voltage. In FIG. 4 the reference a designates a write pulse, the reference b a sustain pulse, the reference c an erase pulse, the reference d a display signal pulse applied to a specific column electrode, and the reference e a line selection pulse. It will be noted that the write pulse a is one that is developed across the electrodes due to a potential difference between the display signal pulse d and the line selection pulse e.

The line scanning is carried out in the above illustrated embodiment in the way that the write pulse is supplied to the respective lines $X_l$-$X_m$ at the same time while the line selection pulse and the erase pulse is supplied from line to line, thereby enabling the respective lines in sequence.

The analog-to-digital converter within the signal processor circuit 8 develops digital signals of 3 bits A, B and C representative of eight tone levels pursuant to the following table. Provided that the pulse width generator 19 within the display signal pulse generator 20 provides different pulse widths $t_0$-$t_7$ corresponding to the eight brightness levels, the multiplexer 20 provides the display signal pulse signals with a pulse width equal to $t_5$.

TABLE

| brightness level | A | B | C |
|---|---|---|---|
| $B_0$ | 0 | 0 | 0 |
| $B_1$ | 0 | 0 | 1 |
| $B_2$ | 0 | 1 | 0 |
| $B_3$ | 0 | 1 | 1 |
| $B_4$ | 1 | 0 | 0 |
| $B_5$ | 1 | 0 | 1 |
| $B_6$ | 1 | 1 | 0 |
| $B_7$ | 1 | 1 | 1 |

According to the teachings of the present invention, application of the write pulse and the erase pulse to the thin-film ELP is timed to be in agreement with a luminescence enabling period and a non-luminescence disabling period. A steady picture is available when the write pulse and the erase pulse are both suppressed and the sustain pulse remains unsuppressed.

The present invention relies upon one of the vision properties of the human eye, and the relationship between the luminescence intensity B and the critical fusion frequency CFF, where a flicker is perceptible to the human eye and is varied with the persistence period $\tau$ of an electroluminescent panel. The longer the persistence period $\tau$ the lower the critical fusion frequency CFF as long as the brightness is identical. The present invention also provides a moving picture with little or no flicker by causing the ratio of the enabling period to the disabling period to be much greater.

A preferred form of the present invention, which features a moving picture model steady picture selection, using the interlaced scanning operation, will be described in more detail, by reference to a block diagram of FIG. 6.

A composite TV signal received at a signal input terminal 6 is separated into a video signal and a synchronizing signal through a signal separator 7. These signals are sent to a signal processor 8 and a timing control 9, respectively. The signal processor 8 comprises a sample hold circuit and an analog-to-digital converter, whereby the video signal is sequentially sampled with clock signals and converted into, for example, a 3-bit digital signal representative of any brightness level of eight gradation $B_0$, $B_1$, . . . $B_7$.

Figure 7:
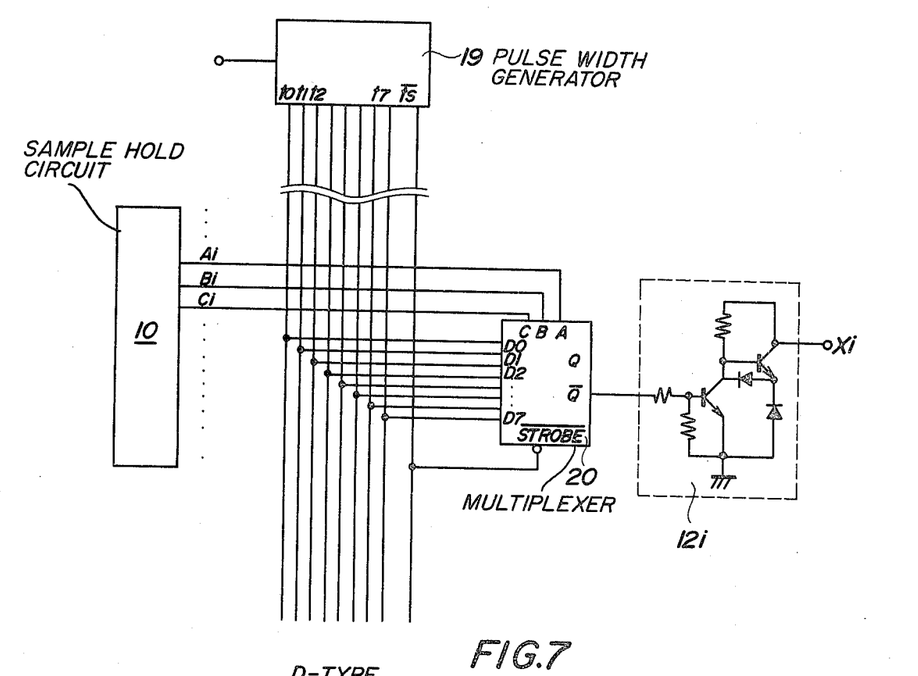
FIG. 7 is a representative example of a display signal generator and an electrode enabling circuit in the preferred form of FIG. 6.
Figure 10:
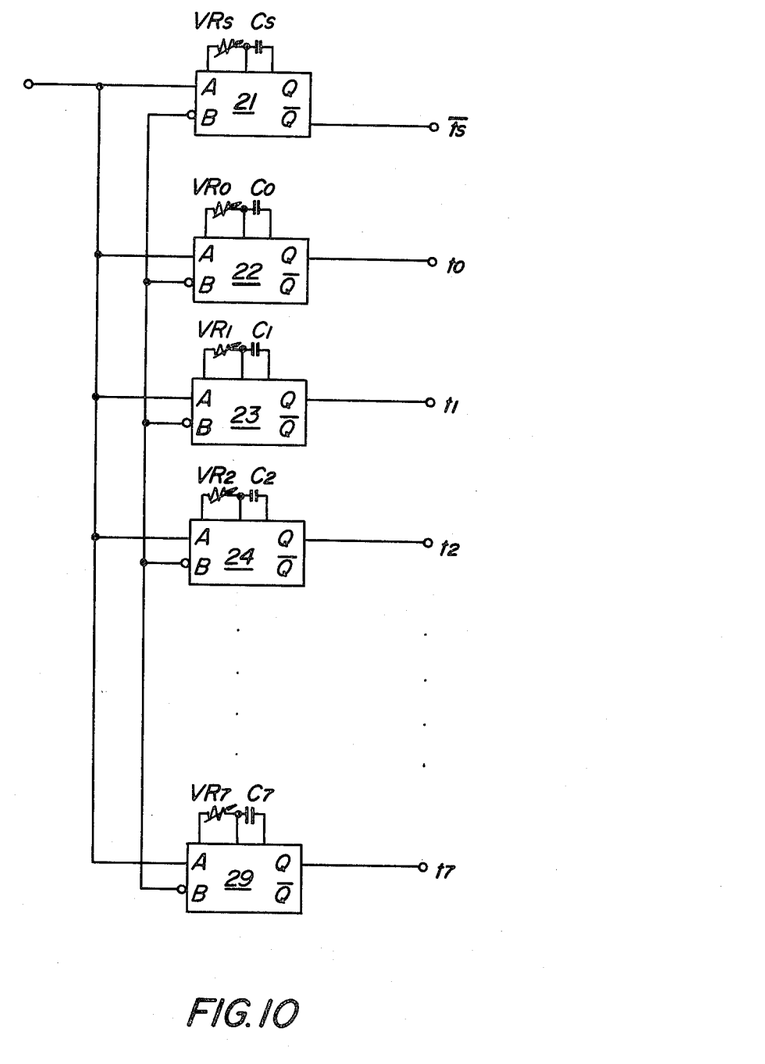
FIG. 10 is a block diagram associated with display signals applied to respective electrodes $X_1$-$X_m$ in the preferred form.

A signal hold circuit 10 is a shift register which holds each of the 3 bit brightness signals for the respective X line family $X_1$-$X_m$ of the matrix display panel 18. A display signal pulse generator 11 generates the display signal pulses which are amplitude modulated in accordance with the above described digital brightness signals. A representative example of the generator 11 is shown in FIG. 7 wherein only one generator is shown for a single electrode line, for the sake of convenience. A pulse width generator 19 provides pulses of eight different widths depicted in FIG. 10 at the respective output lines $t_0$, $t_1$, $t_2$, . . . $t_7$. A multiplexer 20 provides at the output terminal Q thereof pulses corresponding to the contents of the 3 bit brightness signals Ai, Bi and Ci. An X electrode driver 12 drives a particular one of the electrodes $X_1$, $X_2$ . . . $X_n$ of the panel 18 in response to the display signal pulse.

Meanwhile, a sustain pulse generator 14, an erase pulse generator 15 and a line selection pulse generator 16 generate respectively the sustain pulse, the erase pulse and the line selection pulse already discussed with respect to FIG. 4. Those pulses are supplied to Y electrodes $Y_1$, $Y_2$, . . . $Y_n$ through a Y column electrode driver 17 in response to instructions sent from the timing control 9. Such a time relationship, when this occurs, will be described below. The timing control 9 provides various control signals in accordance with the clock signals from the clock generator 13 and the TV synchronizing signals. The timing control 9 includes two major important components, a field control signal generator and a moving picture and steady picture selection control.

Figure 8:
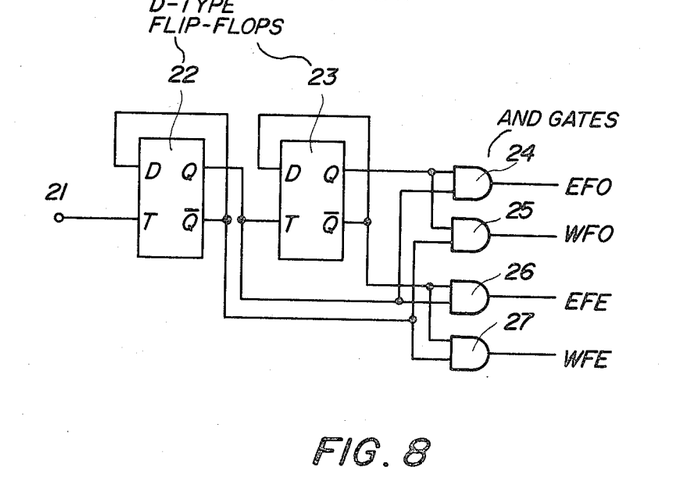
FIG. 8 is an example of a field control signal generator within a timing control in the preferred form.

The field control signal generator provides, sequentially, an odd field erase interval signal EFO, an odd field write interval signal WFO, an even field erase interval signal EFE and an even field write interval signal WFE within each frame. A typical example thereof is shown in FIG. 8 which comprises a vertical synchronizing pulse input terminal 21, a D type flip-flops 22, 23 and AND gates 24, 25, 26, 27.

Figure 9:
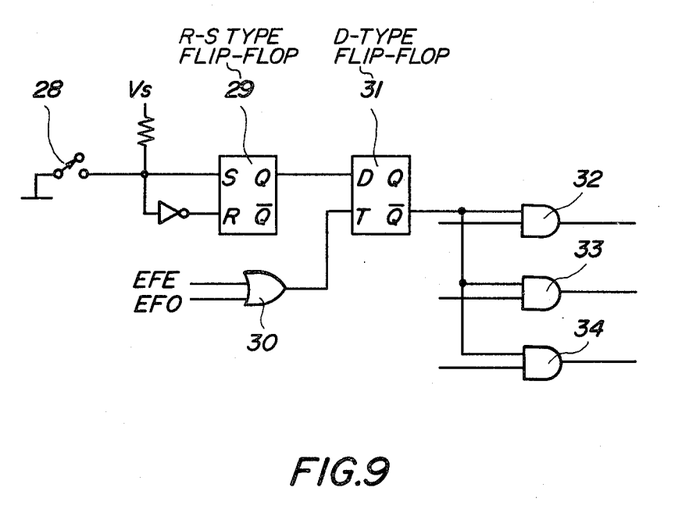
FIG. 9 is a moving picture and steady picture selector within the timing control in the preferred form.

The moving picture/steady picture selection control provides a control in supplying pulses relating to the erase pulse and the write pulse at a predetermined timing pursuant to operation of a selector knob, with an example thereof shown in FIG. 9.

This example includes a selection switch 28, an RS type flip flop storing information relating to whether the steady picture mode is selected, an OR logic gate 30 sensing whether the erase interval signal EFE or EFO is derived, a D type flip flop 31 which is inverted in synchronism with the output of the OR logic gate 30 following the selection of the steady picture mode, an AND logic gate 32 controlling the erase pulse to supply, an AND logic gate 33 controlling the line selection pulse to supply, and an AND logic gate 34 controlling the display signal pulse to supply.

In the following description as to operation, the moving picture mode is called "a dynamic mode (DM)" and the steady picture mode "a static mode (SM)." The DM will be described first.

Figure 6:
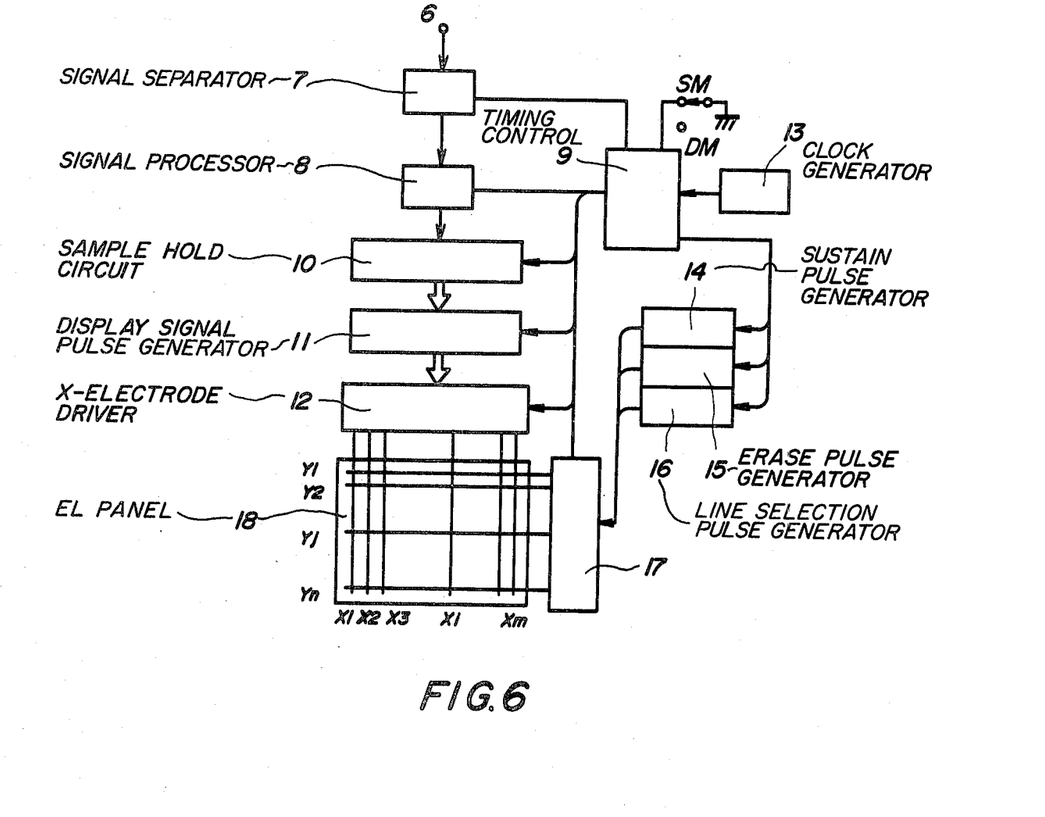
FIG. 6 is a block diagram of one preferred form of the present invention.
Figure 11:
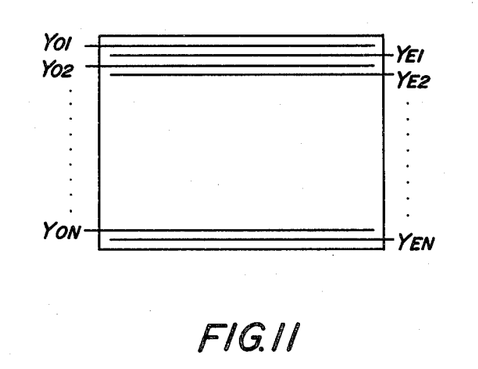
FIG. 11 is a representation for explanation of an interlaced scanning operation of the matrix ELP in the preferred form.

As the illustrated embodiment carries out the interlaced scanning operation, $Y_1, Y_2 \ldots Y_n$ of FIG. 6 is treated as being divided into the odd electrode lines $Y_{O1}, Y_{O2}, \ldots Y_{ON}$ and the even electrode lines $Y_{E1}, Y_{E2}, \ldots Y_{EN}$ (FIG. 11). In other words, $Y_1 = Y_{O1}, Y_2 = Y_{E1}, Y_3 = Y_{O2}, \ldots Y_{n-1} = Y_{ON}$, and $Y_n = Y_{EN}$, thereby $n = 2N$.

According to a conventional TV broadcasting, an odd field interval and an even field interval are allotted every 1/60 seconds, executing the interlaced scanning operation at a ratio of 2:1 and displaying an image at 30 frames per second. In contrast, in the embodiment of the present invention, a write ratio of 15 frames per second is available and each field consists of a write field WF and an erase field EF.

Figure 12:
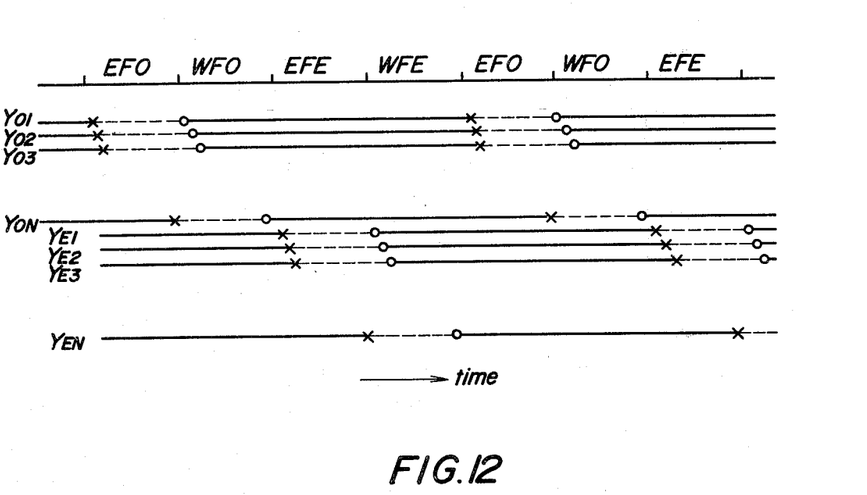
FIG. 12 is a time chart of a field control in the preferred form.

FIG. 12 represents the four fields EFO, WFO, EFE and WFE, and the enabling periods and disabling period in each line. The symbol O denotes when the write pulse is to applied and the symbol X when the erase pulse is to be applied. The solid line denotes the enabling period TB and the broken line the disabling period TN.

During the horizontal scanning period (1H = 63.5 μs) of the odd field write interval WFO, the video signals $S_1$-$X_m$ are sampled in sequence and held at the signal hold circuit 10. After completing the 1H sampling operation, the display signal pulses are supplied to the electrodes $X_1, X_2, \ldots X_m$ one at a time. Concurrently, the line selection pulses are supplied from the scanning electrode $Y_{O1}$. The result is that the write pulse is applied to the m picture elements on the scanning electrode $Y_{O1}$, permitting that element to cause the electroluminescence at a brightness corresponding to the input signal.

Subsequent to this, the sampling of the video signals and loading into the signal hold circuit as to $Y_{O2}$ are executed during the horizontal scanning period so that the picture element on the scanning electrode $Y_{O2}$ emits light. This continues until the scanning electrode $Y_{ON}$ is selected and enabled to emit light. Once those picture elements are supplied with the write pulse, they are held in the electroluminescent state with the sustain pulse until the erase pulse comes. The odd scanning electrodes $Y_{O1}, Y_{O2}, \ldots Y_{ON}$ are supplied with the write pulses beginning with the odd field write field interval WFO and ending with the next succeeding odd field erase interval EFO which appears within 3×1/60 seconds of the preceding odd field write interval WFO. The erase operation is carried out in the order of $Y_{O1}, Y_{O2}, \ldots Y_{ON}$ in the same way as in the write mode. Since the odd scanning electrodes $Y_{O1}, Y_{O2}, \ldots Y_{ON}$ in the erase state are allowed to emit light in response to the next video signal during the odd field write interval WFO immediately after the erase interval EFO, that is, in 1/60 second, all the picture elements belonging to the odd scanning electrodes continue to emit light for 3×1/60 seconds and remain disabled for 1/60 seconds.

The above mentioned operation is repeated at a rate of 1/15 seconds, advancing in image developments.

The writing mode is carried out on the even scanning electrodes $Y_{E1}, Y_{E2}, \ldots Y_{EN}$ during the even field write interval WFE. After those picture elements are held in the enabled state for 3×/60 seconds, they are erased for the even field erase interval EFE and then retained for 1/60 seconds. The next succeeding image is written within the next succeeding even field write interval WFE. For all the picture elements, the three-field enabling period and the one-field disabling period are executed alternatively with respect to each other in this way. If the viewer desires to turn the TV receiver from the DM to the SM, then the switch 28 is flipped ON so that the RS type flip flop 29 is set at once and the D input to the D type flip flop increases to a "H" level. Under the circumstance, when the odd field erase interval signal EFO or the even field erase interval signal EFE is developed, the D type flip flop 31 is triggered so that the output $\bar{Q}$ thereof changes from a "H" level to a "L" level. Therefore, the respective outputs of the AND logic gates 32, 33, 34 are curbed, preventing the erase pulse and the write pulse from being supplied to the line electrodes $Y_{O1}$-$Y_{EN}$ and preventing the next coming image from being supplied to the signal hold circuit 10. It will be apparent from FIG. 4 that the display image is held on the matrix panel 18 with the sustain pulse.

Figure 13A:
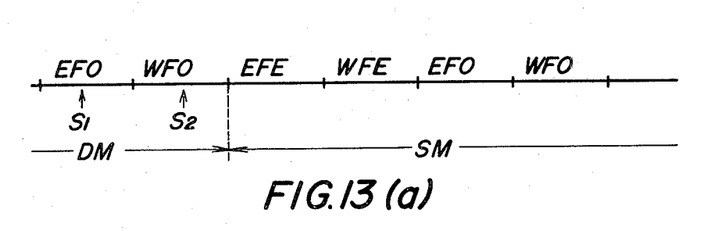
FIGS. 13(a) and 13(b) are time charts for explanation of a selection from a moving picture mode to a steady picture mode in the preferred form.
Figure 13B:
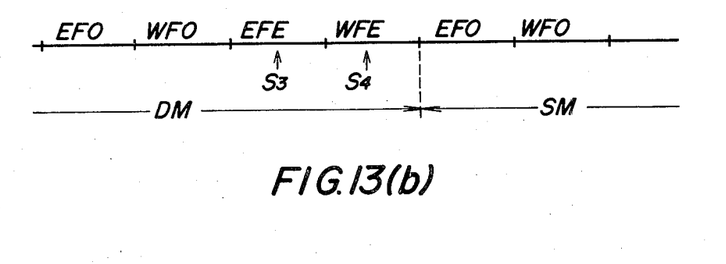
Figure 14:
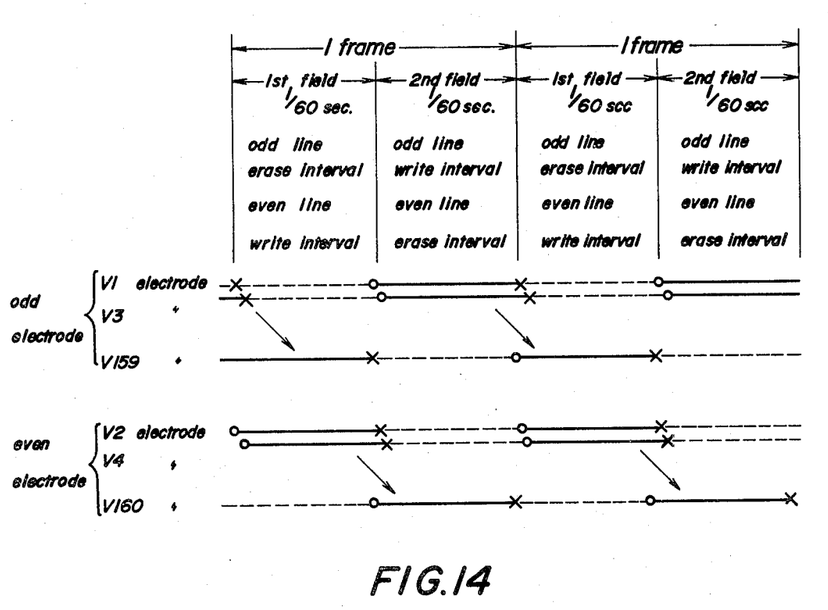
FIG. 14 is a time chart of another preferred form of the present invention.

While FIG. 13(a) shows the sequential events where the mode is about to change from DM to SM in response to the viewer's instructions $S_1$ or $S_2$ given within the field interval EFO or WFO, FIG. 13(b) shows the events in DM→SM responsive to the viewer's instructions $S_3$ or $S_4$ within the field interval EFE or WFE. When all the picture elements on the odd or even scanning electrodes are written thoroughly in this way, the display will come to a standstill, ensuring an excellent, steady and constant image.

Contrarily, if the mode is to change from SM to DM, it is better that DM be restored prior to the field interval EFO or EFE. This is because a failure to do so results in disturbing an image even for a very short period of time. Another reason is that a selection from DM to SM is carried out by a common circuit construction. However, it is not necessarily required that the viewer's mode selection be synchronous with the circuit operation because the transition condition lasts only several tens ms and the resulting disturbance in the displayed image is thus not perceptible to the viewer's eye.

According to one of the major features of the present invention, the write field and the erase field are repeated alternatively and the line scanning operation is carried out with the common circuit configuration, ensuring the simplicity of the enabling circuit and the control circuit. Since the write pulses and the erase pulses are not crowded within the same field, this allows freedom in selecting the number and pulse width of the respective pulses. This facilitates adjustment in image quality. The enabling period can be selected much longer than the disabling period, thereby achieving a high brightness TV screen. Moreover, since a TV image is transmitted at a rate of 30 frames per second and, it can be displayed for a period of time of 3×1/60 seconds, and this makes it possible to prevent the critical fusion frequency from reducing and thus avoids the flickering effects. With the inventor's experiments, satisfactory TV images were obtained without the flickering effects.

As noted already, the ELP is enabled to beam at a duty ratio of ⅔ and with an image display rate of 15 frames per second in the above disclosed embodiment as best seen from FIG. 13.

It is obvious in the art that each frame of a TV image consists of a first field and a second field. In another preferred form of the invention, video signals are written in the line sequential manner while performing the interlaced scanning operation. Within the first field of the TV signal, the write mode is carried out on the odd lines of the ELP and at the same time the erase mode is carried out on the even lines thereof. Within the succeeding second field of the TV signal, the erase mode is carried out on the odd lines and the write mode is carried out on the even lines. The beaming state of the ELP is maintained with the sustain pulses during a period of time from application of the write pulse until application of the erase pulse. The write pulse and the erase pulses can be applied in the above illustrated timed relationship, eliminating the flickering effects and attaining a higher rate of image display.

Figure 15:
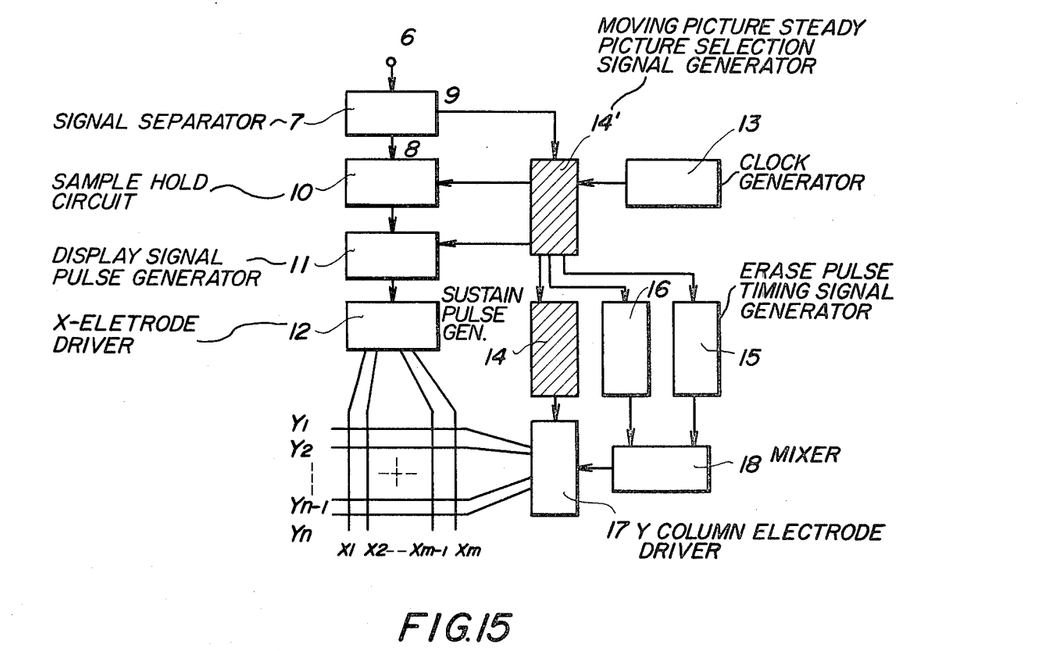
FIGS. 15 and 16 are a block diagram and a time chart of another preferred form.
Figure 16:
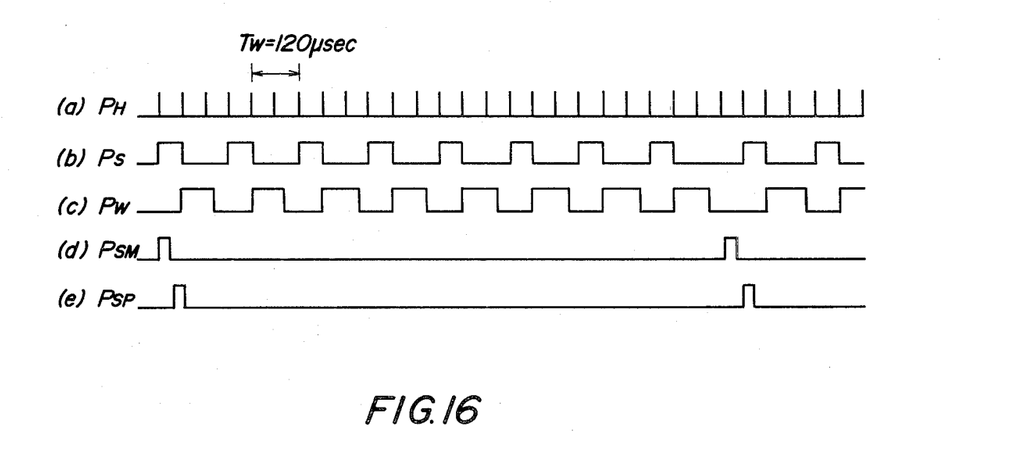

FIGS. 15 and 16 illustrate another preferred form of the present invention wherein the shadow blocks are modified in the way that the pulse width of the sustain pulse is different between the DM and SM. A circuit 14' provides a moving picture/steady picture selection signal, a circuit 16 provides a selection pulse timing signal, and a circuit 15 provides an erase pulse timing signal. A composite circuit 18 mixes the selection pulse and the erase pulse together for the line driver. A sustain pulse timing signal generator 14 provides a sustain pulse of which the pulse width is different when in the moving picture mode and in the steady picture mode. The signal from the generator 14 is applied to the line driver 17. The outputs of the line driver are supplied to the line electrode group $Y_1-Y_n$.

In the case where that the size of the TV screen panel is greater with an increase in the number of the electrodes, the period for application of the write pulses is normally longer. The period for application of the sustain pulses is normally shorter. This will be apparent from FIG. 16 which shows the waveforms when the vertical scanning electrodes amount to 160. In FIG. 16, the write pulse is applied after the sampling is executed almost every third H(H: the horizontal scanning period). FIG. 16(a) represents the horizontal synchronizing signal PH, FIG. 16(b) represents the signal PS indicative of the sampling period, and FIG. 16(c) represents the write selection pulse signal. There are approximately 240 horizontal synchronizing signals within each field of the TV signal. Of all those synchronizing signals, 80 signals are extracted from the first frame and another 80 signals are extracted from a different frame. The vertical scanning electrodes of the ELP are supplied with the scanning pulses in an interlaced manner. In this instance, the period of time for application of the write pulse is at most approximately 120 μsec. While the sustain pulses of either polarity extend over a period PS (approximately 63.5 μsec), only the positive or negative polarity of the sustain pulse, when applied will result in nonuniformity in the brightness. The write pulse is applied in a line sequential or point sequential manner whereas the sustain pulse is applied to all the electrode lines at the same time. The respective picture elements are different in brightness during a period from beginning with the application of the write pulse until the application of the sustain pulse. Provided that the write pulse is applied between the sustain pulses, the picture element thus written will beam again in response to application of the sustain pulse following the write pulse, applied. If the sustain pulse immediately after the application of the write pulse, is opposite in polarity to the write pulse, the picture element is enabled with this sustain pulse. However, if the sustain pulse has the same polarity as the write pulse, the picture element is barely enabled with the sustain pulse and as a result, it begins beaming in response to the next succeeding pulse having the opposite polarity. These disadvantages are severe when using the half-tone display.

Figures 17A, 17B:
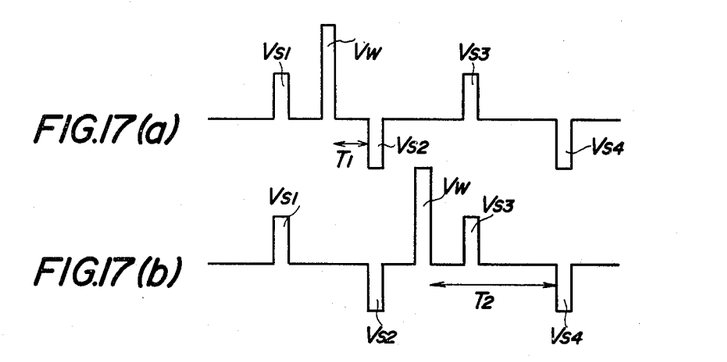
FIGS. 17(a), 17(b) and 18 are time charts showing how to apply a sustain pulse.
Figure 18:
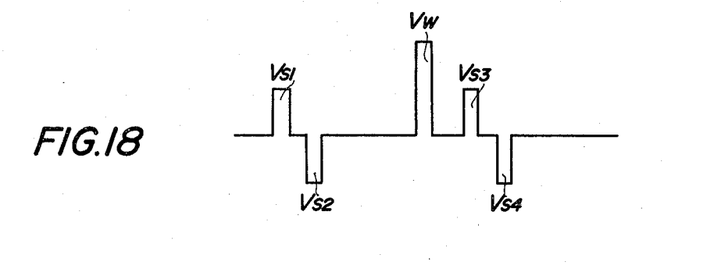

In addition, provided that the write pulse $V_W$ is not applied between the sustain pulses $V_{s1}$ and $V_{s2}$ but between the sustain pulses $V_{s2}$ and $V_{s3}$ as shown in FIG. 17(b), it will be able to prevent a sustain pulse from being applied immediately after, application of a write pulse $V_w$. Nevertheless, in this case the period of time to apply the write pulse is very limited. In another preferred form shown in FIG. 18, a spacing between the sustain pulses $V_{s1}$ and $V_{s2}$ $V_{s3}$ and $V_{s4}$ are selected to be much shorter, while a spacing between the sustain pulses $V_{s2}$ and $V_{s3}$ is longer in order to provide more room for the write pulse $V_W$.

The invention being thus described, it will be obvious that the same may be varied in many ways. Such modifications are not to be regarded as a departure from the spirit and scope of the invention, and all such modifications are intended to be included within the scope of the following claims.

We claim:
1. A television receiver comprising:
   a television image screen including a thin-film electroluminescent panel possessing inherent memory characteristics; and
   a driver circuit arrangement means for enabling and disabling said thin-film electroluminescent panel during a write field interval of time and an erase field interval of time, respectively.
2. A television receiver comprising:
   a television image screen including a thin-film electroluminescent panel possessing inherent memory characteristics;
   a driver circuit arrangement means for alternately enabling and disabling said thin-film electroluminescent panel with write pulses and erase pulses during a write field interval of time and an erase field interval of time, respectively; and
   means for preventing said write pulses and said erase pulses from being supplied to said thin-film electroluminescent panel thereby causing the image displayed on said thin-film electroluminescent panel to come to a standstill.
3. A television receiver comprising:
   a television image screen including a thin-film electroluminescent panel having hysteresis properties in the applied voltage vs brightness characteristics;
   first circuit means for enabling said thin-film electroluminescent panel by energizing said panel with write pulses, erase pulses and sustain pulses when said panel operates in a normal moving picture mode; and
   second circuit means for enabling said thin-film electroluminescent panel by energizing said panel only with said sustain pulses when said panel operates in a steady picture mode.
4. A television receiver comprising:
   a television image screen including a thin-film electroluminescent panel having hysteresis properties in the applied voltage vs brightness characteristics; and means for selectively enabling said thin-film electroluminescent panel to display an image in either a normal moving picture mode or a steady picture mode, said image not moving when said panel displays said image in said steady picture mode.

5. The television receiver of claim 3, wherein said sustain pulses have a first pulse width when said panel operates in the normal moving picture mode said sustain pulses having a second pulse width when said panel operates in the steady picture mode.

6. The television receiver of claim 3, wherein said panel is comprised of at least two sets of coordinately related scanning lines electrode means for generating a line scan of said panel, at least one of said sets being represented by successive odd and even line numbers; and wherein said thin-film electroluminescent panel is enabled by scanning the lines of said panel in an interlaced manner.

7. The television receiver of claim 6 wherein the said odd numbered lines of said electroluminescent panel are enabled and energized by said erase pulses during an odd line erase interval of time, the odd lines of said panel being energized by said write pulses during an odd line write interval of time subsequent to said odd line erase interval of time, the even lines of said electroluminescent panel being enabled and energized by said erase pulses during an even line erase interval of time subsequent to said odd line write interval of time, the even lines of said panel being enabled and energized by said write pulses during an even line write interval of time subsequent to said even line erase interval of time.

8. The television receiver of claim 6 wherein the odd lines of said electroluminescent panel are enabled and energized by said write pulses during an odd line write interval of time, the even lines of said panel being energized by said erases pulses during an even line erase interval of time simultaneously with the energization of said odd lines by said write pulses during said odd line write interval of time, the odd lines of said panel being energized by said erase pulses during an odd line erase interval of time subsequent to said odd line write interval of time and said even line erase interval of time, the even lines of said panel energized by said write pulses during an even line line write interval of time simultaneously with the energization of the odd lines by said erase pulses during said odd lines erase interval of time.

9. A television receiver for driving an electroluminescent display panel, said panel having a plurality of a first set of electrodes and a plurality of a second set of electrodes disposed substantially normal to said first set of electrodes, said receiver comprising:

means for receiving a composite television signal including a video signal and a synchronizing signal;

separating means for separating said video signal from said synchronizing signal;

first pulse generating means responsive to said video signal from said separating means for generating a display signal pulse, said display signal pulse including a plurality of pulses, each of said plurality of pulses having a pulse characteristic which varies in accordance with said video signal, said display signal pulse energizing said first set of electrodes;

second pulse generating means responsive to said synchronizing signal from said separating means for generating a line selection pulse for selecting one of said plurality of a second set of electrodes when said display signal pulse energizes said first set of electrodes;

said second pulse generating means generating an erase pulse for energizing said one of said plurality of a second set of electrodes subsequent to the energization of said first set of electrodes and said one of said plurality of a second set of electrodes by said display signal pulse and said line selection pulse, respectively;

said second pulse generating means generating a sustain pulse for sustaining the electroluminescence of said display panel subsequent to the energization of said first set of electrodes and said one of said plurality of a second set of electrodes by said display signal pulse and said line selection pulse, respectively, and prior to the generation of said erase pulse; and disabling means for disabling said first pulse generating means to prevent the generation of said display signal pulse and for disabling said second pulse generating means to prevent the generation of said line selection pulse and said erase pulse, said disabling means permitting said second pulse generating means to generate said sustain pulse whereby a steady, non-moving image is created on said electroluminescent display panel, said disabling means capable of permitting said first pulse generating means to generate said display signal pulse and said second pulse generating means to generate said line selection pulse and said erase pulse, whereby a moving image is created on said display panel.

10. A television receiver in accordance with claim 9 wherein said disabling means prevents the generation of said display signal pulse, said line selection pulse and said erase pulse and permits the generation of said sustain pulse in response to the completion of the generation of said line selection pulse for each of said plurality of a second set of electrodes, said non-moving image being created on said electroluminescent display panel when the selection of each of said plurality of a second set of electrodes in creating said moving image is completed.

11. A television receiver receiving a composite television signal for driving an electroluminescent display panel, said panel having a plurality of a first set of electrodes and a plurality of a second set of electrodes arranged substantially normal to said first set of electrodes, said receiver comprising:

first means responsive to said composite television signal for generating a plurality of display signal pulses having a pulse characteristic which varies in accordance with said composite television signal, said plurality of display signal pulses energizing said plurality of a first set of electrodes;

second means responsive to said composite television signal for generating a line selection pulse for selecting one of said plurality of a second set of electrodes, said second means generating an erase pulse subsequent to the generation of said display signal pulses and said line selection pulse by said first means and said second means, respectively, said erase pulse erasing the image created on said one of said plurality of a second set of electrodes subsequent to the energization of said first set of electrodes by said display signal pulses and to energization of said one of said plurality of a second set of electrodes by said line selection pulse;

controlling means connected to said first means and said second means and responsive to said composite television signal for controlling the generation of said display signal pulses, said line selection pulses and said erase pulses, the energization of said first set of electrodes by said display signal pulses and said one of said plurality of a second set of electrodes by said line selection pulse defining a write pulse at the intersection between said first set of electrodes and said one of said plurality of a second set of electrodes, said controlling means alternatingly and sequentially energizing said second set of electrodes with erase pulses and the write pulses.

12. A television receiver in accordance with claim 11 wherein said second set of electrodes include an odd second set of electrodes and an even second set of electrodes interdigitated with said odd second set of electrodes, said controlling means alternatingly and sequentially energizing said odd second set of electrodes with erase pulses and write pulses, said controlling means alternatingly and sequentially energizing said even second set of electrodes with erase pulses and write pulses in response to the completion of energization of said odd second set of electrodes by said erase pulses and said write pulses.

13. A television receiver in accordance with claim 12 wherein the duration of time between application of said write pulse to said odd second set or said even second set of electrodes to the application of said erase pulse to said odd second set or said even second set of electrodes is three times longer than the duration of time between the application of said erase pulse to said odd second set or said even second set electrodes to the application of said write pulse to said odd second set or said even second set of electrodes.

* * * * *

UNITED STATES PATENT AND TRADEMARK OFFICE
CERTIFICATE OF CORRECTION

PATENT NO. : 4,234,821
DATED : November 18, 1980
INVENTOR(S) : Noritoshi Kako et al.

It is certified that error appears in the above—identified patent and that said Letters Patent is hereby corrected as shown below:

In the heading "[30] Foreign Application Priority Data", please insert the following:

-- Sep. 30, 1977 [JP] Japan ...... 52/118080

Sep. 27, 1977 [JP] Japan ...... 52/116401

Sep. 27, 1977 [JP] Japan ...... 52/116402

Sep. 27, 1977 [JP] Japan ...... 52/116404 --

Signed and Sealed this

Sixteenth Day of June 1981

[SEAL]

Attest:

RENE D. TEGTMEYER

Attesting Officer     Acting Commissioner of Patents and Trademarks